United States Patent
Jung

(10) Patent No.: US 9,496,587 B2
(45) Date of Patent: Nov. 15, 2016

(54) PROTECTION CIRCUIT MODULE WITH THERMISTOR AND BATTERY PACK INCLUDING THE SAME

(75) Inventor: Yeon Sung Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1445 days.

(21) Appl. No.: 13/100,501

(22) Filed: May 4, 2011

(65) Prior Publication Data

US 2012/0028083 A1   Feb. 2, 2012

(30) Foreign Application Priority Data

Jul. 29, 2010 (KR) .................. 10-2010-0073442

(51) Int. Cl.
  *H01M 14/00* (2006.01)
  *H01M 10/48* (2006.01)
  *H02H 5/04* (2006.01)

(52) U.S. Cl.
  CPC ........... *H01M 10/486* (2013.01); *H02H 5/044* (2013.01)

(58) Field of Classification Search
  CPC ............ H01M 10/486; H01M 10/4257; H01M 10/5026; H01M 2/1016; H01M 2/06; H01M 2/1282; H01M 2200/10
  See application file for complete search history.

(56) References Cited

FOREIGN PATENT DOCUMENTS

| JP | 07-320708 | * 12/1995 | .............. H01M 2/10 |
|---|---|---|---|
| JP | 2004-349119 | 12/2004 | |
| JP | 2007-141782 | 6/2007 | |
| KR | 10-1998-0038177 | 8/1998 | |
| KR | 1020000019863 | 4/2000 | |
| WO | WO 2006/067903 | 6/2006 | |

OTHER PUBLICATIONS

KIPO Office action dated Oct. 24, 2011, for Korean priority Patent application 10-2010-0073442, noting listed references in this IDS, 4 pages.

KIPO Notice of Allowance dated Nov. 8, 2012, for Korean priority Patent application 10-2010-0073442, (1 page).

* cited by examiner

*Primary Examiner* — Raymond Alejandro
(74) *Attorney, Agent, or Firm* — Lewis Roca Rothgerber Christie LLP

(57) ABSTRACT

A protection circuit module with a thermistor and a battery pack including the same. In one embodiment, a battery pack includes a protection circuit module and one or more bare cells. The protection circuit module includes a printed circuit board (PCB) having a protection circuit portion, a flexible film electrically connected to the PCB, and a thermistor mounted on the flexible film and configured to sense a temperature of bare cells and transfer the sensed temperature to the PCB. The one or more bare cells are electrically connected to the protection circuit module. Accordingly, the thermistor is mounted on the flexible film, so that it is possible to obtain the reliability of measuring the temperature of the battery pack.

10 Claims, 4 Drawing Sheets

PROTECTION CIRCUIT MODULE WITH THERMISTOR AND BATTERY PACK INCLUDING THE SAME

CROSS-REFERENCE TO RELATED APPLICATION

This application claims priority to and the benefit of Korean Patent Application No. 10-2010-0073442, filed on Jul. 29, 2010, in the Korean Intellectual Property Office, the entire content of which is incorporated herein by reference.

BACKGROUND

1. Field

An aspect of the present invention relates to a battery pack.

2. Description of the Related Art

In general, a battery pack is used in portable electronic devices such as a notebook computer using a battery as a power source. In the battery pack, a plurality of batteries (or bare cells) can be connected in parallel or in series to have set or predetermined voltage and current levels, and the connected batteries can be assembled in a case with a set or predetermined shape. If the temperature of the batteries becomes too high, the batteries may be damaged, and further, a system that receives power supplied from the batteries may be damaged due to an explosion of the batteries. Hence, where the power supplied from the batteries is supplied to the system, it is very important to control the temperature of the batteries.

A thermistor can be used as a protection device in a battery pack to sense a temperature level that is determined to be a condition for disconnection of the batteries in the battery pack. However, where the thermistor is attached to a specific battery cell or provided between battery cells, the thermistor measures only the temperature of a portion of a battery pack. Therefore, when a defect occurs in a cell other than the cells having the thermistor attached or provided thereto, it is difficult to precisely measure the exact temperature of the entire battery pack, or temperature measuring can be slow or delayed. Hence, due to the imprecise or slow measurement of the thermistor, a protection circuit using a thermistor may take action that is too late, resulting in a problem such as damage to the battery pack or to the system receiving power from the battery pack.

SUMMARY

Aspects of embodiments of the present invention are directed toward a protection circuit module and a battery pack including the protection circuit module provided with a thermistor that does not sense only the temperature of a portion of the battery pack but selectively senses a portion from which much heat is generated.

Aspects of embodiments of the present invention are directed toward a protection circuit module provided with a thermistor configured to enhance the reliability of measuring a temperature of a battery pack and the battery pack including the protection circuit module that enables the thermistor to enhance the reliability of measuring the temperature of the battery pack.

According to an embodiment of the present invention, a protection circuit module includes a printed circuit board (PCB) having a protection circuit portion, a flexible film electrically connected to the PCB, and a thermistor mounted on the flexible film and configured to sense a temperature of bare cells and transfer the sensed temperature to the PCB.

The flexible film may be a flexible printed circuit board (FPCB).

The thermistor may be mounted on a surface of the FPCB.

The thermistor may be mounted on an interior of the FPCB.

In one embodiment the FPCB includes a plurality of layers, and the thermistor is between the plurality of layers.

In one embodiment the FPCB includes a flexible substrate and an insulating film on the flexible substrate, and the thermistor is between the flexible substrate and the insulating film.

The FPCB may be configured to expose a portion of the thermistor to face the bare cells.

In one embodiment the protection circuit module further includes a heat transfer thin film on the flexible substrate and a protection layer on the heat transfer thin film.

The heat transfer thin film may be composed of aluminum.

According to another embodiment of the present invention, a protection circuit module includes a printed circuit board (PCB) having a protection circuit portion, and a thermistor mounted on the PCB and configured to sense a temperature of bare cells and transfer the sensed temperature to the PCB, wherein the thermistor includes a support body, a terminal portion formed at a side of the support body, and a temperature sensor formed at another side of the support body.

According to another embodiment of the present invention, a battery pack includes a protection circuit module including a printed circuit board (PCB) having a protection circuit portion, a flexible printed circuit board (FPCB) electrically connected to the PCB, and a thermistor mounted on the FPCB; and a plurality of bare cells electrically connected to the protection circuit module, wherein the FPCB is configured to sense a temperature of the bare cells and transfer the sensed temperature to the PCB.

The thermistor may be mounted on a surface of the FPCB facing the bare cells.

The thermistor may be mounted on an interior of the FPCB facing the bare cells.

In one embodiment the FPCB is formed with a plurality of layers, and the thermistor is between the plurality of layers.

In one embodiment the FPCB includes a flexible substrate and an insulating film on the flexible substrate, and the thermistor is between the flexible substrate and the insulating film.

In one embodiment the FPCB is configured to expose a portion of the thermistor to face the bare cells.

The battery pack may further include a heat transfer thin film on the flexible substrate and a protection layer on the heat transfer thin film.

The heat transfer thin film may be composed of aluminum.

The bare cells may be connected in series or in parallel, and the thermistor may be adjacent to each of the plurality of bare cells.

In one embodiment the thermistor is configured to sense the temperature of the plurality of adjacent bare cells.

In one embodiment the thermistor is mounted at identical distance from each of the plurality of bare cells.

The protection circuit module and the thermistor may be connected by a patterned circuit formed on the FPCB

BRIEF DESCRIPTION OF THE DRAWINGS

The accompanying drawings, together with the specification, illustrate exemplary embodiments of the present

DETAILED DESCRIPTION

Figure 1:
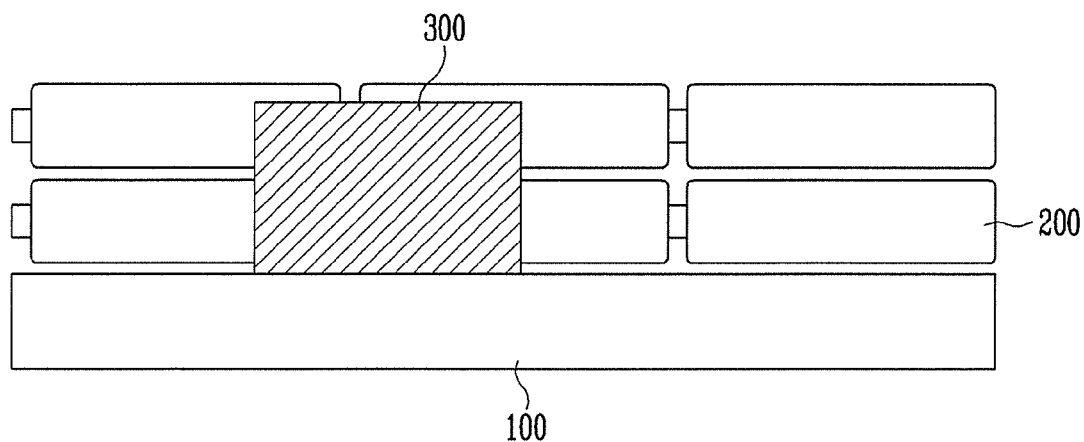
FIG. 1 is a plan view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. When terms that indicate directions, such as to top, bottom left and right, are used without special notation, the terms indicate directions represented in the drawings.

First Embodiment

Figure 2A:
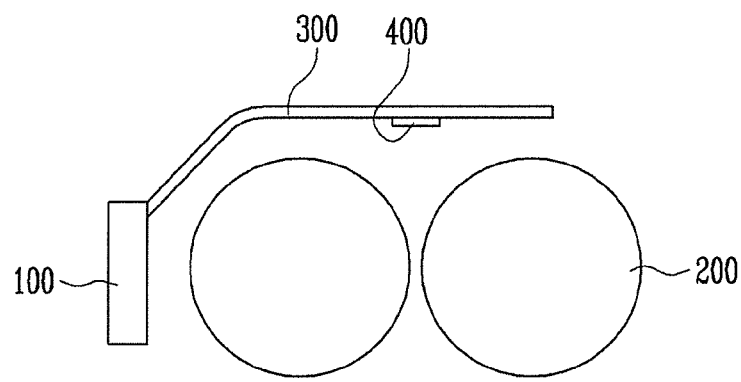
FIG. 2A is a side view of the battery pack of FIG. 1.

FIG. 1 is a plan view of a battery pack according to an embodiment of the present invention. FIG. 2A is a side view of the battery pack of FIG. 1.

As shown in FIGS. 1 and 2A, a battery pack according to an embodiment of the present invention includes one or more bare cells 200 connected in series or in parallel; a protection circuit module (PCM) 100 electrically connected to the bare cells 200 and including a printed circuit board (PCB) and a protection circuit portion; a flexible film such as a flexible printed circuit board (FPCB) 300, which is connected to the PCM 100; and a thermistor 400 mounted to the FPCB 300. The flexible film has flexibility, and a conductive pattern can be formed on the flexible film. In this embodiment, the flexible film is broadly defined to include the FPCB 300.

In FIG. 1, the PCM 100 refers to the entire body on which a protection circuit portion is mounted on a PCB. First, a module and a protection circuit portion may be mounted on the PCM 100. Here, the module may perform charging/discharging of the battery and communication functions with the exterior thereof, and the protection circuit portion can ensure stability in the battery pack by monitoring the temperature of the bare cells. The PCM 100 may be provided with terminals connected to the respective bare cells 200. Each of the bare cells 200 may be connected to a terminal provided to the PCM 100 through a member such as a nickel tab, which may serve as an electric wire.

A FPCB 300 having a thermistor 400 according to an embodiment is shown in FIG. 2A. As shown in FIG. 2A, the thermistor 400 may be mounted on a surface of the FPCB 300, which is connected to the PCM 100, and the thermistor 400 may be mounted facing the bare cells 200.

Figure 2B:
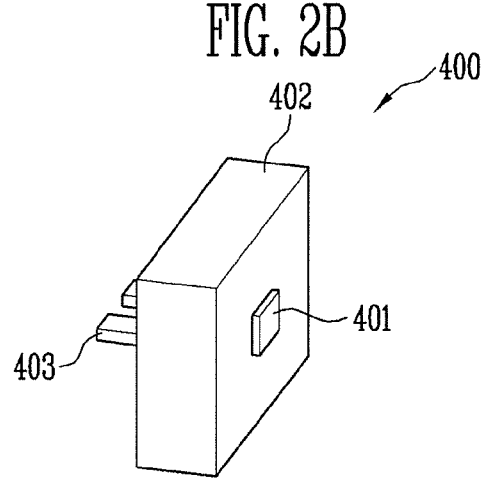
FIG. 2B is a perspective view of a thermistor mounted on a flexible printed circuit board (FPCB) according to an embodiment of the present invention.

FIG. 2B is a perspective view of a thermistor 400 mounted on an FPCB 300. The thermistor 400 shown in this figure may be a semiconductor formed by mixing two or three kinds of oxides including cobalt, copper, manganese, iron, nickel, titanium, or any other suitable material, and sintering the mixture so as to have a suitable resistivity and a suitable temperature coefficient. The thermistor 400 may be classified as a negative temperature coefficient (NTC) thermistor or a positive temperature coefficient (PTC) thermistor. In one embodiment, the NTC thermistor has a negative resistance temperature coefficient such that its resistance decreases as temperature increases, and a PTC thermistor has a positive resistance temperature coefficient such that its resistance increases as temperature increases. Since the thermistor 400 can have low thermal capacity, its resistance may rapidly change even with a minute change in temperature. Therefore, a thermistor 400 is frequently used as a sensor for temperature control. In one embodiment, in the thermistor 400, a temperature sensor 401 may be formed on a support body 402, and a terminal portion 403 that transfers information sensed by the temperature sensor 401 may be provided to the support body 402.

In one embodiment, the thermistor 400 may be mounted on the FPCB 300 so that the temperature sensor 401 is positioned in a direction (or location) adjacent to the bare cells 200 on the FPCB 300. The temperature sensor 410 of the thermistor 400 can therefore easily receive (or sense) heat transferred (or emitted) from the bare cells 200.

The thermistor 400 may be connected to the protection circuit portion of the PCM 100 through wires patterned on the FPCB 300. A control portion such as a micro-computer (micom) may be provided to the protection circuit portion of the PCM 100. In one embodiment, the control portion may receive (or measure) various characteristics of a battery, such as voltage and current, as electrical signals, and may generate a control signal to aid in protecting the battery.

FIGS. 3A, 3B, 3C and 3D are sectional views showing mounting configurations of a thermistor on a FPCB according to embodiments of the present invention.

According to embodiments of the present invention, the thermistor 400 is mounted on the FPCB 300 in various suitable configurations using various suitable methods. The FPCB 300 in one embodiment is formed by printing a micro-circuit on a substrate made of, for example, a flexible plastic material. The FPCB 300 can have advantages in that high-density and three-dimensional wiring is possible, durability for repetitive bending is high, there is little or no error from wiring, and fabrication is satisfactory. In embodiments of the present invention, it is possible to sense the temperature of only a portion of the bare cell 200, for example, a portion from which much heat is generated, or any portion necessary for sensing, using the FPCB 300. Since the FPCB 300 is a flexible film, it is possible to mount the thermistor 400 at any desired position on the FPCB 300.

The FPCB 300 may be formed as a flexible substrate made of an insulative sheet including polyethylene terephthalate (PET), polyimide (PI), or any other suitable insulative material. In one embodiment, wires for connecting the thermistor 400 and the PCM 100 are formed as a patterned circuit on the FPCB 300. In one embodiment, the patterned circuit is printed using copper, nickel or any other material suitable for printing a patterned circuit.

Therefore the PCM 100 and the thermistor 400 may be connected by the patterned circuit formed on the FPCB 300.

Figure 3A:
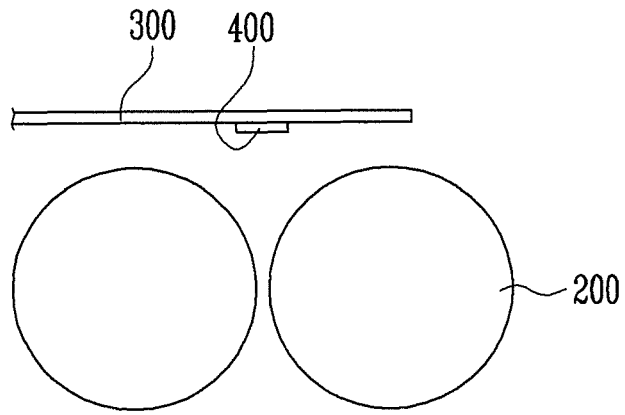
FIGS. 3A, 3B, 3C and 3D are sectional views showing mounting configurations of a thermistor on a FPCB according to embodiments of the present invention.
Figure 3B:
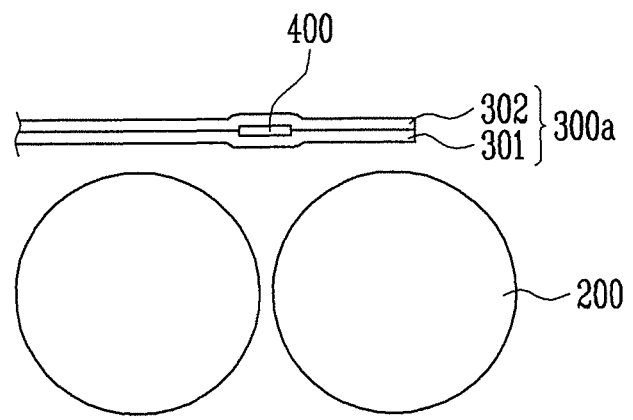

FIG. 3A shows a thermistor 400 mounted on one surface of the FPCB 300. As shown in FIG. 3B and in one embodiment, a FPCB 300a is formed into a multi-layered structure. For example, a separate insulating film 301, which faces the bare cells, may be additionally formed on a surface of a flexible substrate 302 of the FPCB 300a. In this case, the thermistor 400 may be positioned between the insulating film 301 and the flexible substrate 302 of the FPCB 300a.

Figure 3C:
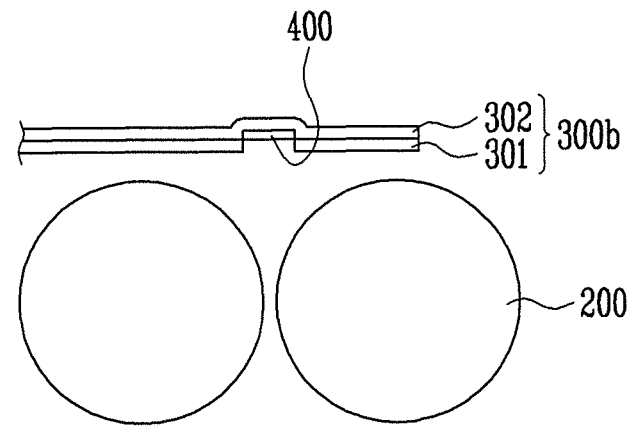

FIG. 3C shows a FPCB 300b having another shape. In this embodiment, the thermistor 400 is positioned between an insulating film 301 and a flexible substrate 302 of the FPCB 300b, and a portion of the insulating film 301 may be removed (e.g., cut away) so that the thermistor 400 is directly exposed to the bare cells 200 in a region in which the thermistor 400 is positioned.

Figure 3D:
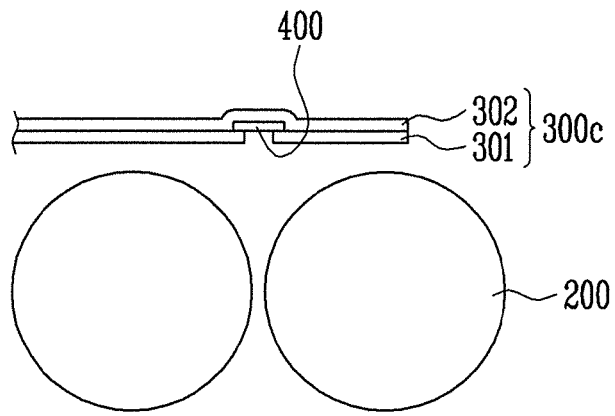

In one embodiment, as shown in FIG. 3D, only a portion of an insulating film 301 formed on a flexible substrate 302 of a FPCB 300c is removed (e.g., cut away) so that only a partial surface of the thermistor 400 is exposed. Thus, the insulation properties of the insulating film 301 covering the thermistor 400 can be maintained, and the thermistor 400 will not be easily separated from the FPCB 300c.

Although it has been described in this embodiment that a thermistor 400 may be mounted on a FPCB 300a, 300b or 300c with a multi-layered structure, the FPCB 300a, 300b or 300c may be formed into a single-layered structure. That is, the thermistor 400 may be mounted in an accommodating groove formed in one region of a FPCB having a single-layered structure.

Second Embodiment

Figure 4:
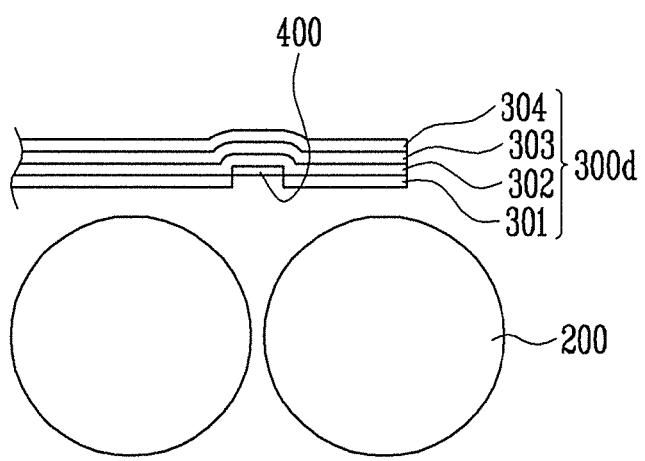
FIG. 4 is a sectional view showing an interlayer structure of a FPCB according to an embodiment of the present invention.

FIG. 4 is a sectional view showing an interlayer structure of a FPCB according to an embodiment of the present invention.

In FIG. 4, a structure is shown in which heat from the bare cells 200 can be well transferred to (or received by) a thermistor 400. In this embodiment, the FPCB 300d is formed into a multi-layered structure. For example, the FPCB of this embodiment may be formed by stacking an insulating film 301, a flexible substrate 302, a heat transfer thin film 303 and a protection layer 304, which are sequentially adjacent to bare cells 200. However, the present invention is not thereby limited, and the layers may be stacked in any suitable order adjacent to bare cells 200.

In one embodiment, the thermistor 400 is provided in a region adjacent to the bare cells 200 on the FPCB 300d. In one embodiment, the heat transfer thin film 303 and the protection layer 304 are additionally formed on the FPCB of the first embodiment. The heat transfer thin film 303 may be formed as a thin film on the flexible substrate 302 using, for example, aluminum. The heat transfer thin film 303 can rapidly receive heat transferred from a portion of the bare cells 200 that the thermistor 400 does not reach, and the heat transfer thin film 303 can transfer the heat to the thermistor 400. Therefore, the thermistor 400 can measure the average temperature of a wide area through use of the heat transfer thin film 303.

In one embodiment, as shown in FIG. 4 and as described above, the thermistor 400 is mounted between the insulating film 301 and the flexible substrate 302, and a portion of the insulating film 301 is removed (e.g., cut away) so that the thermistor 400 is exposed to face the bare cells 200.

Third Embodiment

Figure 5:
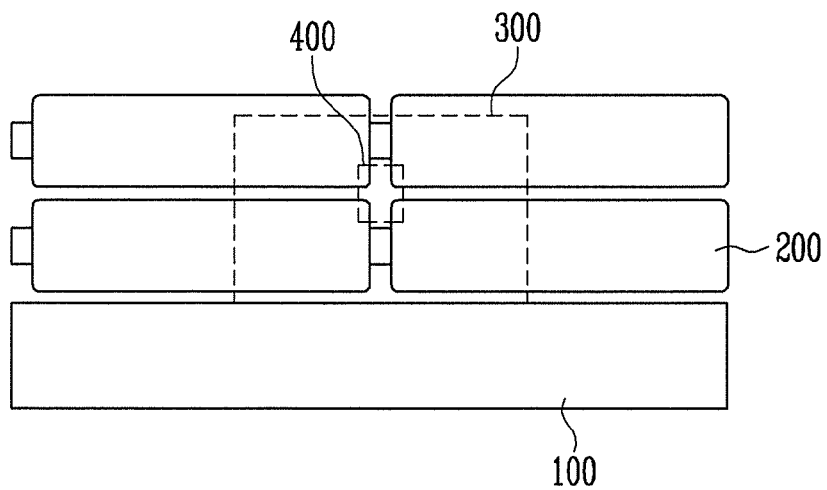
FIG. 5 is a schematic view showing a mounting position (or configuration) of a thermistor according to an embodiment of the present invention.

FIG. 5 is a schematic view showing a mounting position (or configuration) of a thermistor according to an embodiment of the present invention. As shown in FIG. 5 and in one embodiment, the thermistor 400 formed on the FPCB 300 is disposed to measure an average peripheral temperature of all of the bare cells, rather than being biased to a specific cell. In this case, the thermistor 400 may be mounted on the FPCB 300 so that it is positioned over as many bare cells 200 as possible or so that it is positioned at the same (or identical) distance from each of the bare cells 200. In one embodiment, the thermistor 400 is disposed to be adjacent to each of the bare cells 200 rather than being biased to only some of the bare cells 200, so that the average temperature of all of the bare cells 200 can be uniformly measured. Accordingly, the thermistor may be mounted on the flexible film, so that it is possible to obtain the reliability of measuring the temperature of the battery pack.

Fourth Embodiment

Figure 6:
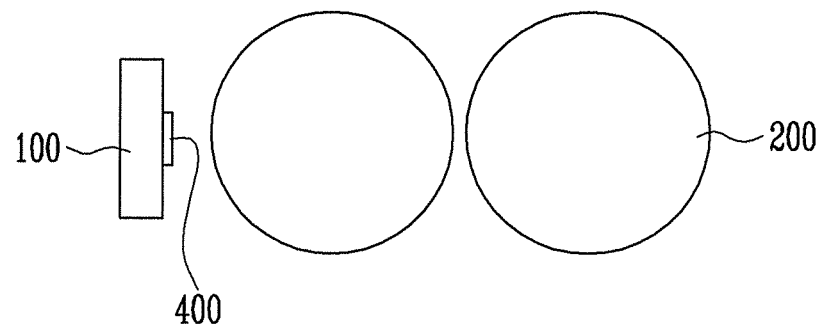
FIG. 6 is a schematic view showing a mounting position (or configuration) of a thermistor according to an embodiment of the present invention.

FIG. 6 is a schematic view showing a mounting position (or configuration) of a thermistor according to an embodiment of the present invention. In this embodiment, the thermistor 400 is mounted on a surface of a PCM 100, and faces the bare cells 200. As such, the thermistor 400 is directly mounted on the PCM 100 and not on a FPCB. In this case, the mounting position of the thermistor can be selected freely to be any desired position on the PCM 100.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a protection circuit module comprising a printed circuit board having a protection circuit portion, a flexible printed circuit board ectrically connected to the printed circuit board, and a thermistor mounted on the flexible printed circuit board; and
   a plurality of bare cells electrically connected to the protection circuit module, wherein the flexible printed circuit board is configured to sense a temperature of the plurality of bare cells and transfer the sensed temperature to the printed circuit board, and the flexible printed circuit board comprises:
      a flexible substrate and an insulating film on the flexible substrate, the thermistor being between the flexible substrate and the insulating film,
      a heat transfer thin film on the flexible substrate, and
      a protection layer on the heat transfer thin film.

2. The battery pack according to claim 1, wherein the thermistor is mounted on a surface of the flexible printed circuit board facing the plurality of bare cells.

3. The battery pack according to claim 1, wherein the thermistor is mounted on an interior of the flexible printed circuit board facing the plurality of bare cells.

4. The battery pack according to claim 1, wherein the flexible printed circuit board is formed with a plurality of layers, and the thermistor is between the plurality of layers.

5. The battery pack according to claim 4, wherein the FPCB is configured to expose a portion of the thermistor to face the bare cells.

6. The battery pack according to claim 1, wherein the heat transfer thin film is composed of aluminum.

7. The battery pack according to claim 1, wherein bare cells of the plurality of bare cells are connected in series or in parallel, and the thermistor is adjacent to the plurality of bare cells.

8. The battery pack according to claim 7, wherein the thermistor is configured to sense the temperature of the plurality of bare cells adjacent to the thermistor.

9. The battery pack according to claim 7, wherein the thermistor is mounted at identical distance from each of the plurality of bare cells.

10. The battery pack according to claim 7, wherein the protection circuit module and the thermistor are connected by a patterned circuit formed on the flexible printed circuit board.

* * * * *